United States Patent [19]

Freitag et al.

[11] 4,334,053

[45] Jun. 8, 1982

[54] PROCESS FOR THE PREPARATION OF AROMATIC POLYESTERS AND THE USE THEREOF FOR THE PRODUCTION OF INJECTION MOLDED ARTICLES, FILMS AND COATINGS

[75] Inventors: Dieter Freitag, Krefeld; Klaus Reinking, Wermelskirchen; Karsten Idel, Krefeld; Harald Medem, Krefeld; Ludwig Bottenbruch, Krefeld, all of Fed. Rep. of Germany

[73] Assignee: Bayer Aktiengesellschaft, Leverkusen, Fed. Rep. of Germany

[21] Appl. No.: 191,670

[22] Filed: Sep. 29, 1980

[30] Foreign Application Priority Data

Oct. 3, 1979 [DE] Fed. Rep. of Germany ....... 2940024

[51] Int. Cl.³ .................................................. C08F 4/46
[52] U.S. Cl. .................................... 528/179; 528/193; 528/194
[58] Field of Search ....................... 528/179, 193, 194

[56] References Cited

U.S. PATENT DOCUMENTS 3,160,602  12/1964  Kantor et al. ...................... 528/179

*Primary Examiner*—Morton Foelak
*Attorney, Agent, or Firm*—Connolly and Hutz

[57] ABSTRACT

Aromatic polyesters based on diphenols, terephthalic and isophthalic acid and particular chain terminators exhibit an improved color number, an improved flowability and increased dimensional heat stability with otherwise comparable mechanical characteristics.

9 Claims, No Drawings

PROCESS FOR THE PREPARATION OF AROMATIC POLYESTERS AND THE USE THEREOF FOR THE PRODUCTION OF INJECTION MOLDED ARTICLES, FILMS AND COATINGS

The invention relates to thermoplastic aromatic polyesters having molecular weights which have been controlled using specific chain terminators, a preparation method according to the phase boundary surface process and the use of these polyesters for the production of injection moulded articles, films and coatings.

Aromatic polyesters are known (W. M. Eareckson, J. Polym. Sci. XL, 399–406 (1959); Andre Conix, "Thermoplastic Polyesters from Bisphenols," Ind. Eng. Chem., Vol. 51, No. 2, 147–150, Febr. 1959; French Pat. No. 1,177,517 U.S. Pat. No. 3,351,624, German Auslegeschrift No. 1,445,384). Due to their excellent characteristics, they are widely used where the requirements are a high melting point and a high glass transition temperature, a high dimensional stability under heat and good impact strength or notch toughness.

Although the aromatic polyesters, known hitherto, meet many requirements, experts are interested in further improving the characteristics of these polyesters.

Surprisingly, it has now been found that this may be achieved by using specific compounds to terminate the polyester molecules.

The object of the invention are thermoplastic aromatic polyesters based on diphenols, terephthalic and isophthalic acid chlorides (acid chloride ratios from 7:3 to 3:7), chain terminators and optionally branching agents, characterised in that the chain terminators are compounds of the formula (I):

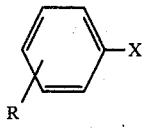

(I)

wherein
X represents OH, OCOCl or COCl, and
R represents a branched chain alkyl radical having 8 or 9 carbon atoms provided that in the alkyl radical R 47 to 89% of the H-Atoms are part of methyl groups, that R is in the o- and/or p-position and the upper limit of the amount of the o-isomer is 20%.

Another object of the invention is a process for the preparation of these polyesters according to the two-phase boundary surface process characterised in that the compounds of formula (I), optionally in a solvent, are introduced simultaneously with the terephthalic and isophthalic acid dichlorides or the solutions thereof into the stirred two phase mixture consisting of alkaline aqueous diphenolate solution, catalysts and a solvent for the aromatic polyester.

Another object of the invention is the use of these aromatic polyesters for the production of injection moulded articles, films and coatings.

Diphenols which are preferred for the preparation of the polyesters of the invention are compounds of the formula (II):

HO—Z—OH       (II)

wherein Z represents a bifunctional, mono or poly nuclear aromatic radical having from 6 to 30 carbon atoms, whereby Z is structured so that the two OH—groups are each directly bonded to a carbon atom of the aromatic system.

Diphenols which are particularly preferred are compounds of the formula (III):

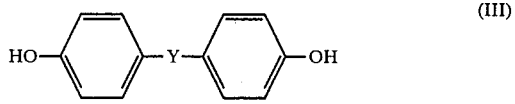

(III)

wherein
Y represents a direct bond, an alkylene or alkylidene radical having from 1 to 7 carbon atoms, a cycloalkylene or cycloalkylidene radical having from 5 to 12 carbon atoms, —O—, —S—,

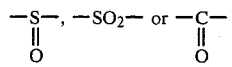

also the nuclear-alkylated and nuclear-halogenated derivatives thereof, e.g.
  Hydroquinone,
  Resorcin,
  Dihydroxydiphenols;
  Bis-(hydroxyphenyl)-alkanes;
  Bis-(hydroxyphenyl)-cycloalkanes;
  Bis-(hydroxyphenyl)-sulphides;
  Bis-(hydroxyphenyl)-ethers;
  Bis-(hydroxyphenyl)-ketones;
  Bis-(hydroxyphenyl)-sulphoxides;
  Bis-(hydroxyphenyl)-sulphones, and
  α,α'-Bis-(hydroxyphenyl)-diisopropylbenzenes,
and also the nuclear-alkylated and nuclear-halogenated compounds thereof. These and other suitable diphenols are described for example in U.S. Pat. Nos. 3,028,365, 3,275,601, 3,148,172, 3,062,781, 2,991,273, 3,271,367, 2,999,835, 2,970,131 and 2,999,846, in German Offenlegungsschrift Nos. 1,570,703, 2,063,050, 2,063,052, 2,211,956, 2,211,957, French Pat. No. 1,561,518 and in the monograph "H. Schnell, Chemistry and Physics of Polycarbonates, Interscience Publishers, New York, 1964."

The most important diphenols are listed by name in the following:
  bisphenol A=2,2-bis-(4,4-dihydroxy-diphenyl)-propane,
  tetramethylbisphenol A, 1,1-bis-(4-hydroxyphenyl)-isobutane, 1,1-bis-(4-hydroxyphenyl)-cyclohexane,
  4,4-dihydroxydiphenylsulphide, 4,4-dihydroxydiphenyl,
  4,4-dihydroxydiphenylsulphone and the di- and tetrahalogenated derivatives thereof. Bisphenol A is particularly preferred. Any mixture of the mentioned diphenols may also be used.

In order to prepare the aromatic polyesters of the invention, mixtures of terephthalic acid dichloride and isophthalic acid dichloride are used in the molar ratio of from 7:3 to 3:7. Mixtures of terephthalic acid dichloride and isophthalic acid dichloride in the molar ratio of 1:1 are preferred.

The compounds of formula (I), to be used as the chain terminator to control the molecular weight, are known (compare e.g. J. Amer. Chem. Soc. 56, 1583–1586 (1934)) or they may be prepared in a simple manner.

Compounds of formula (I) which are preferred according to the invention are for example:

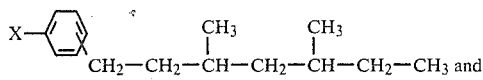

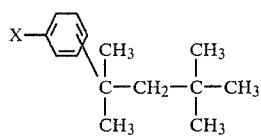

For the preparation of the aromatic polyesters of the invention, a single compound as well as mixtures of the compounds may be used.

They are used in quantities of from 0.1 to 10 mol %, preferably from 0.3 to 7 mol % (in the case of phenols based on diphenols, in the case of acid chlorides and chlorocarbonic acid esters based on acid dichlorides).

The following may be used, for example, as branching agents: 3- or higher functional carboxylic acid chlorides, such as trimesic acid trichloride, cyanuric acid trichloride, 3,3′,4,4′-benzophenonetetracarboxylic acid tetrachloride, 1,4,5,8-naphthaline tetracarboxylic acid tetrachloride or pyromellitic acid tetrachloride, in quantities of from 0.01 to 1.0 mol % (based on the used dicarboxylic acid dichlorides) or 3- or higher functional phenols, such as phloroglucine, 4,6-dimethyl-2,4,6-tri-(4-hydroxyphenyl)-heptene-2,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis[4,4-bis-(4-hydroxyphenyl)-cyclohexyl]-propane,
2,4-bis-(4-hydroxyphenyl-isopropyl)-phenol,
tetra-(4-hydroxyphenyl)-methane,
2,6-bis-(2-hydroxy-5-methyl-benzyl)-4-methyl-phenyl,
2-(4-hydroxyphenyl)-2-(2,4-dihydroxyphenyl)-propane,
tetra-(4-[4-hydroxyphenyl-isopropyl]-phenoxy)-methane,
1,4-bis-[(4,4″-dihydroxytriphenyl)-methyl]-benzene in quantities of from 0.01 to 1.0 mol % (based on the diphenols used). Phenolic branching agents may be introduced with the diphenols, acid chloride branching agents may be introduced together with the acid dichlorides.

The aromatic polyesters of the invention may be prepared according to the two-phase boundary surface process. In this process, the diphenols are dissolved in an aqueous-alkaline phase. Into this solution, small quantities, for example from 0.1 to 1.0% by weight (based on the diphenols used), of reducing alkaline substances, such as sodium hydroboron or sodium bisulphite may be introduced simultaneously. As catalysts for the polycondensation reaction, from 0.5 to 5 mol % (based on the diphenols used) of quaternary ammonium- or phosphonium compounds may be introduced into the aqueous-alkaline phase.

Preferred catalysts correspond to the formula (IV):

wherein

A represents a nitrogen atom or phosphorus atom,
X represents chlorine or bromine and
$R^1$, $R^2$, $R^3$ and $R^4$ represents $C_1$–$C_{20}$-alkyl, $C_6$–$C_{10}$-cycloalkyl, $C_7$–$C_{30}$-alkaryl or-aralkyl and two of the radicals $R^1$ to $R^4$ are optionally linked.

The following may be used as a solvent for compounds I, terephthalic/isophthalic acid dichlorides and aromatic polyesters: the organic solvents known from polycarbonate preparation, such as dichloromethane, chloroform, tri- and tetrachloroethylene, tetrachloroethanes, chlorobenzenes, dichlorobenzenes and mixtures of these compounds.

The polyesters of the invention are preferably prepared with intensive stirring at temperatures from 0° C. to 40° C., particularly from 15° C. to 30° C.

The simultaneous dosage of the phenolic compounds (I) and the acid chlorides, to gain reproducible viscosities, and is expediently carried out using a solution of the phenolic compounds (I), the acid chlorides and optionally the solvents mentioned above which is introduced into the stirred dispersion of aqueous-alkaline diphenolate solution and organic solvent.

It may be advantageous in some cases to introduce the acid chlorides and compounds (I) simultaneously, but separately, into the stirred dispersion of aqueous-alkaline diphenolate solution and organic solvent.

The aromatic polyesters according to the invention may be isolated according to the methods known from the polycarbonate synthesis according to the two-phase boundary surface process.

Thus, the organic phase containing the dissolved polyester is separated, washed and the polyester is then isolated by evaporating the solution, whereby an evaporation extruder is used as the final stage of the working up process.

In contrast to the aromatic polyesters usually prepared using phenol, o-phenyl-phenol, p-phenyl-phenol, dimethylphenols, cresols, halogen phenols or p-tert.-butyl phenol as the molecular weight controller, the aromatic polyesters according to the invention exhibit an improved colour number, a substantially improved flowability and increased dimentional stability under heat with otherwise comparable mechanical characteristics.

The aromatic polyesters of the invention usually have relative solution viscosities of from 1.18 to 2.0, particularly from 1.2 to 1.5 (measured in 0.5% solution in dichloromethane at 25° C.).

They may contain stabilisers, for example antioxidants, ultraviolet stabilisers, flowing auxiliary agents and auxiliary agents for mould release or other additives such as fillers e.g. glass fibres, glass balls, asbestos or carbon fibres, kieselgur, kaolin, mineral fibers, rock flour and pigments.

The aromatic polyesters obtained according to the preparation process of the invention are acquired as a unitary granule after extrusion and may be processed into moulded bodies by injection moulding. They are also suitable for the production of films and coatings. In the following Examples, the relative solution viscosity η rel in dichloromethane is determined at 25° C. and at a concentration of 0.5% by weight.

EXAMPLES

Description of the measuring method to determine the flowability

Spiral-shaped strips having dimensions of 2 mm×20 mm are produced on an injection moulding machine of the SKM 141 type (manufacturer: "Stubbe"), at a pressure of 1050 kp/cm$^2$ and at a determined extrusion temperature, whereby the cross-section of the rod feed is 10 mm. The diameter of the injection moulding machine cylinder is 40 cm.

The length of the resulting flow spirals is a measurement for the flowability of the extruder polyester, whereby the length of the flow spirals is directly proportional to the flowability of the polyester.

Description of the methods for measuring the colour number

Spectroscopic colour number determination

The granule of the aromatic polyester, whose colour number is to be determined, is dissolved in dichloromethane (concentration 4 g/100 ml). The vessels used have a layer thickness of 10 cm. The measurements are performed using a spectrometer of the "Cary 219" type, manufactured by Cary USA.

In comparison with pure dichloromethane, the light transmission I at a wave length of 420 nm and the light transmission $I_0$ at a wavelength of 700 nm is measured. The colour number of the granule, measured at 420 nm, is calculated according to the equation:

$$FZ_{(420\ nm)} = 11.5 \times \log(I_0/I)$$

Determination of notch toughness and impact strength

The notch toughness $a_k$ according to Charpy and the impact strength $a_k$ according to Charpy was tested according to DIN 53 453.

Comparactive Example 1

2.28 kg of bisphenol A and 6.8 g of sodium hydroboron and 37.6 g of phenol (4 mol %) are dissolved under nitrogen in 1.88 kg of 45% by weight soda lye and 56 kg of distilled water. 37.1 g (1 mol %) of triphenyl-ethyl-phosphonium bromide are introduced into this solution and 16 kg of dichloromethane and 12.89 kg of chlorobenzene are then added thereto.

A solution of 1035.3 g of isophthalic acid dichloride and 1035.3 g of terephthalic acid dichloride, dissolved in 3 kg of dichloromethane are introduced into this intensively stirred two phase mixture, with water cooling, in 5 minutes at an internal temperature of from 20° to 25° C. and at a pH value of from 12 to 13.

After the addition, the resulting solution is stirred for 5 minutes. The alkaline aqueous phase is then separated, the organic phase is firstly washed with diluted phosphoric acid and then with water until the washing water has a conductivity of $0.1 \cdot 10^{-4}$ S/cm. The polyester is isolated by evaporating the polyester solution and by extrusion using a vacuum extruder at 320° C. The resulting granules have a relative solution viscosity η rel of 1.33.

Comparative Example 2

2.28 kg of bisphenol A and 6.8 g of sodium hydroboron are dissolved in 1.88 kg of 45% by weight soda lye and 56 kg of distilled water, under nitrogen.

37.1 g (1 mol %) of triphenyl-ethyl-phosphonium bromide are introduced into this solution and 16 kg of dichloromethane and 12.89 kg of chlorobenzene are then added thereto.

A solution of
(a) 1035.3 g of isophthalic acid dichloride and 1035.3 g of terephthalic acid dichloride, dissolved in 3 kg of dichloromethane and
(b) a solution of 60.0 g of p-tert-butyl phenol (4 mole %) in 330 g of dichloromethane are introduced simultaneously from 2 inlets into this intensively stirred two phase mixture, with water cooling, in 5 minutes at an internal temperature of from 20° to 25° C. and pH value of from 12 to 13 in the reaction mixture.

After these additions, the resulting solution is stirred for 5 minutes. The alkaline-aqueous phase is then separated, the organic phase is firstly washed with dilute phosphoric acid and then with water until the washing water has reached a conductivity of $0.1 \cdot 10^{-4}$ S/cm.

The polyester is isolated by evaporating the polyester solution and by extrusion using a vacuum extruder at 320° C.

The resulting granules had a relative solution viscosity η rel of 1.263.

EXAMPLE 1 (according to the invention)

An aromatic polyester was synthesized in an analogous manner to the method described in Comparative Example 2, except that instead of the 60.0 g of p-tert.-butyl-phenol as the chain terminator, 82.4 g of p-isooctylphenol (4 mol %) are used. The resulting granules had a relative solution viscosity η rel of 1.267.

EXAMPLE 2 (according to the invention)

An aromatic polyester was synthesized in an analogous manner to the method described in Comparative Example 2, except that instead of 60.0 g of p-tert.-butyl phenol as the chain terminator, 88.0 g of isononylphenol* (4 mol %) are used. The resulting granules had a relative solution viscosity η rel of 1.264.
*87% p-portion 13% o-portion

| | Tabular comparison of characteristics of the aromatic polyesters | | | | | |
|---|---|---|---|---|---|---|
| | η rel granule | notch toughness $a_k$ | impact strength $a_n$ | dimensional stability under heat acc. to Vicat B | colour number | flow spirals |
| Comparison 1 | 1.330 | 19.4 | unbroken | 181° C. | 19.5 | not measured since η rel too high |
| Comparison 2 | 1.263 | 19.0 | unbroken | 185° C. | 11.4 | 21 cm (350° C.) |
| Example 1 | 1.267 | 22.0 | unbroken | 190° C. | 6.4 | 30 cm (388° C.) |

| | | Tabular comparison of characteristics of the aromatic polyesters | | | |
|---|---|---|---|---|---|
| | η rel granule | notch toughness $a_k$ | impact strength $a_n$ | dimensional stability under heat acc. to Vicat B | colour number | flow spirals |
| Example 2 | 1.264 | 20.0 | unbroken | 190° C. | 6.9 | 31 cm (388° C.) |

We claim:

1. Thermoplastic aromatic polyesters based on diphenols, terephthalic and isophthalic acid (acid ratio of from 7:3 to 3:7), chain terminators and optionally branching agents, characterised in that the chain terminators are compounds of the formula (I)

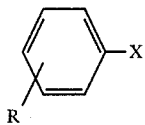

wherein

X represents OH, OCOCl or COCl and

R represents a branched chain alkyl radical having 8 or 9 carbon atoms, provided that in the alkyl radical R 47 to 89% of the hydrogen atoms are part of methyl groups, that R is in the o- and/or p-position and the upper limit of the amount of the o-isomer is 20%.

2. Polyesters according to claim 1, characterised in that they have a relative solution viscosity of from 1.18 to 2.0.

3. Polyesters according to claim 1 or 2, characterised in that they have a relative solution viscosity of from 1.2 to 1.5.

4. Polyesters according to any of claims 1 to 3, characterised in that the chain terminators are compounds of the formulae:

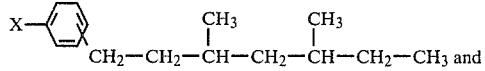

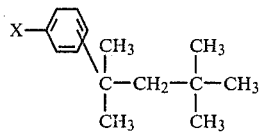

5. A process for the preparation of the polyesters according to claims 1 to 4, according to the two-phase boundary surface process, characterised in that the compounds (I), optionally in a solvent, are introduced simultaneously with the terephthalic and isophthalic acid dichlorides or the solutions thereof into a stirred two phase mixture of an alkaline aqueous diphenolate solution, catalysts, and a solvent for the aromatic polyester.

6. A process according to claim 5, characterised in that the compounds (I) are used in quantities of from 0.1 to 10 mol %.

7. A process according to claim 6, characterised in that the compounds (I) are used in quantities of from 0.3 to 7 mol %.

8. A process according to claims 5 to 7, characterised in that the reaction is carried out at a temperature of from 0° C. to 40° C.

9. The use of the polyesters according to claims 1 to 4 for the production of injection moulded articles, films and coatings.

* * * * *